Dec. 12, 1961 A. HOROWITZ 3,012,616
MACHINE FOR CULTIVATING THE SOIL
Filed Aug. 13, 1958 7 Sheets-Sheet 1

INVENTOR.
ALEXANDRE HOROWITZ
BY Toulmin & Toulmin

ATTORNEYS

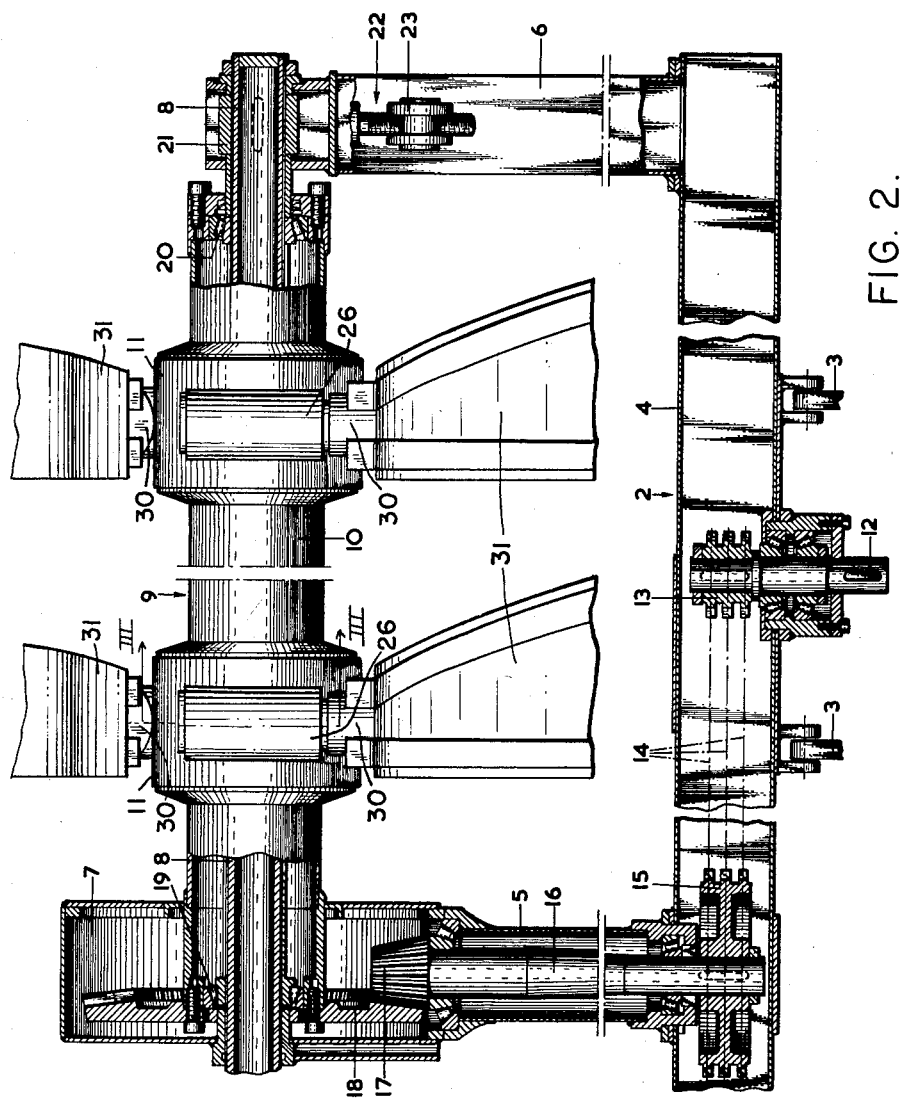

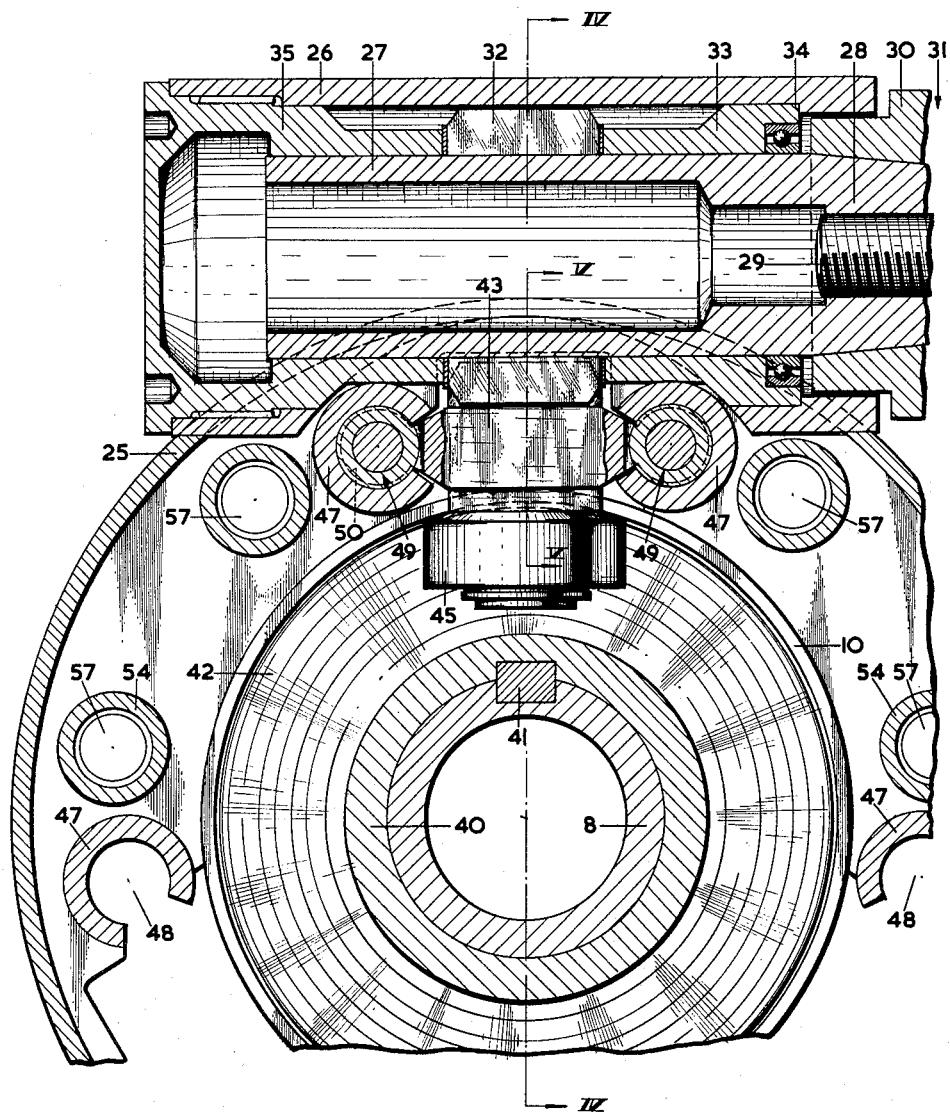

Dec. 12, 1961  A. HOROWITZ  3,012,616
MACHINE FOR CULTIVATING THE SOIL
Filed Aug. 13, 1958  7 Sheets-Sheet 4
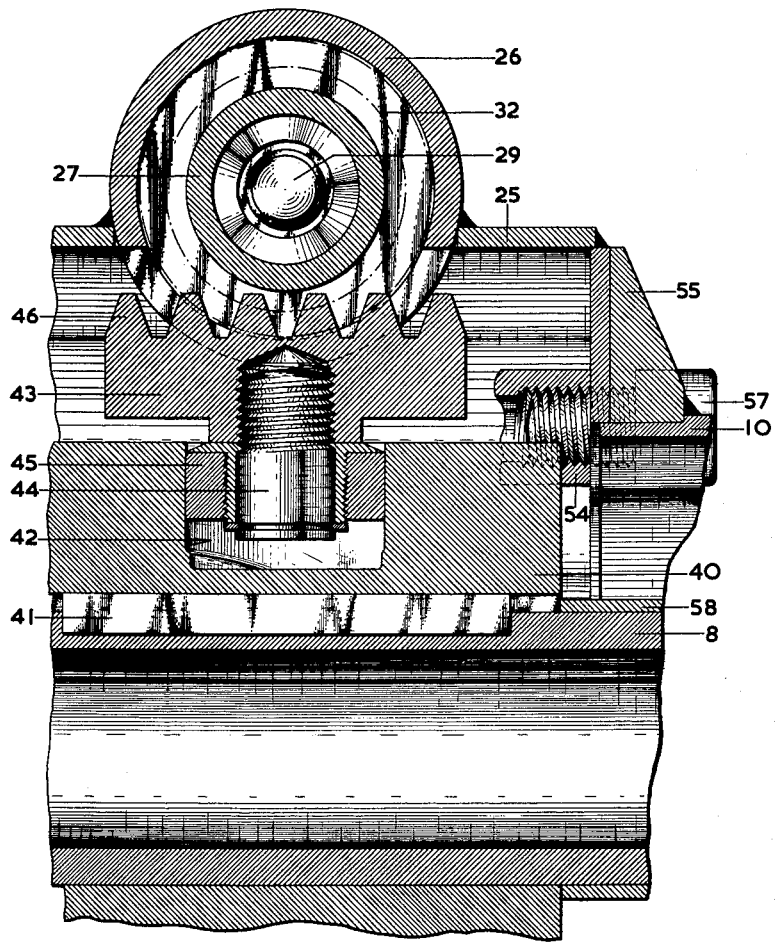
INVENTOR.
ALEXANDRE HOROWITZ
BY Toulmin & Toulmin
ATTORNEYS

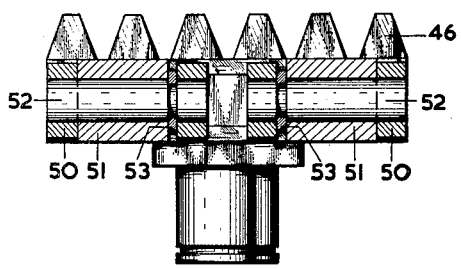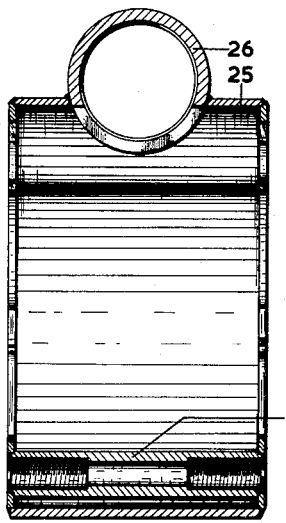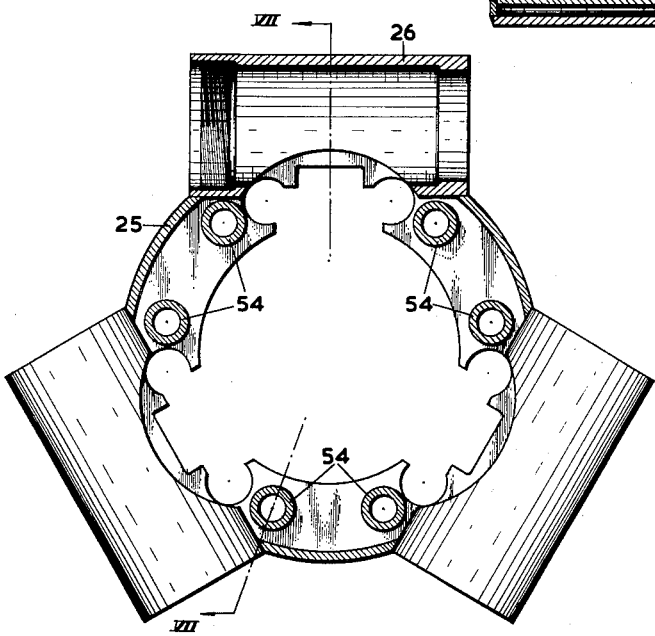

Dec. 12, 1961    A. HOROWITZ    3,012,616
MACHINE FOR CULTIVATING THE SOIL
Filed Aug. 13, 1958    7 Sheets-Sheet 6
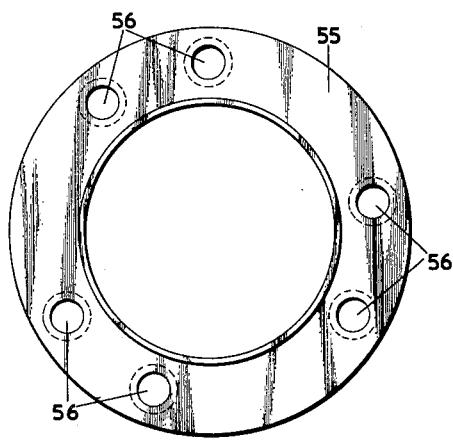
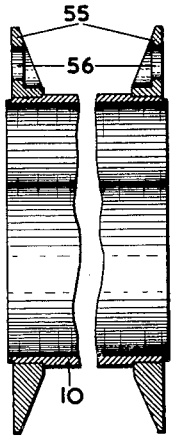
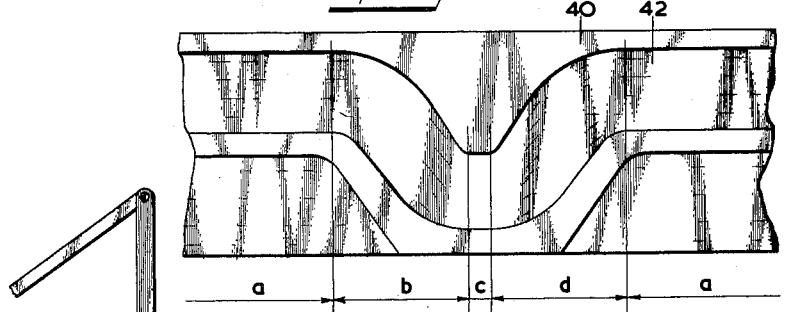
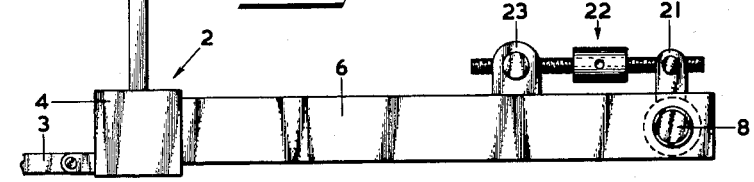
INVENTOR.
ALEXANDRE HOROWITZ
BY Toulmin & Toulmin
ATTORNEYS

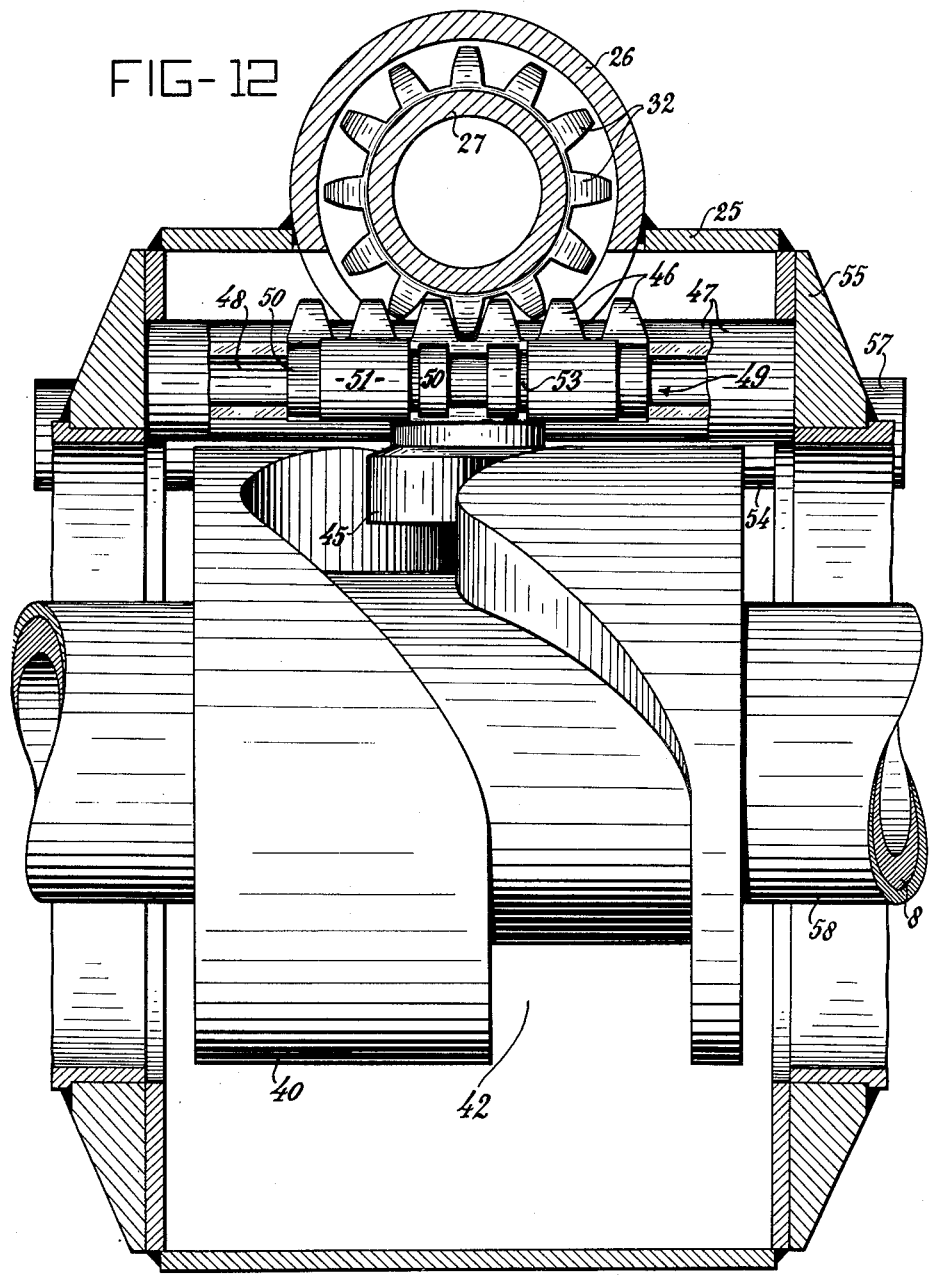

United States Patent Office 3,012,616
Patented Dec. 12, 1961

3,012,616
MACHINE FOR CULTIVATING THE SOIL
Alexandre Horowitz, Amersfoort, Netherlands, assignor to N.V. Ontwikkelingmaatschappij Multinorm, Amersfoort, Netherlands, a corporation of the Netherlands
Filed Aug. 13, 1958, Ser. No. 754,857
Claims priority, application Netherlands Aug. 19, 1957
4 Claims. (Cl. 172—94)

The invention relates to a machine for cultivating the soil, comprising a number of blades having a substantially involute (evolvent) shape, which blades have been attached to a hub that is supported so as to be rotatable relative to a movable frame, each blade being secured on a stub axle rotatably supported in the hub, the axis of said stub axle lying mainly in a plane at a right angle to the axis of the hub. In this known machine the blades are adapted to perform periodically a tilting movement with a view to throwing off the soil which has just been dug up.

The primary object of the invention is to furnish a mechanism for producing this tilting movement of the blades. This object is attained according to the invention by the hub being supported so as to be rotatable on a central shaft fixed relative to the frame, while around this shaft a cam profile has been formed, which is adapted to be engaged by rollers connected with the stub axles of the blades.

In consequence of this measure the blades will perform a tilting movement that is derived from a mechanism which is accommodated centrally in the hub and thus can be screened completely from any penetrating impurities.

The cam profile may be formed in such a way that during the rotation of the hub a relative motion is produced in the radial or in the axial sense, viewed from the fixed central shaft around which the cam profile has been formed. If the cam profile is adapted to cause a relative axial motion, it is favourable for each roller to be supported on an intermediate member guided in the hub, which member is adapted to reciprocate in a plane parallel to the axis of the hub, while on said member a toothed rack has been formed, which meshes with teeth cut on at least a part of the outer circumference of the stub axle in question. Through this measure the relative axial displacement during the rotation of the hub is converted into an oscillation of the stub axles of the blades.

This mechanism will preferably be constructed in such a way that the guiding means for the reciprocating intermediate member are formed by tube sections secured on either side of said member in the hub, which tube sections have been provided on one side, over a sector of less than 180°, with a longitudinally extending gap, shoes attached to the sides of the intermediate member being adapted to slide in said tube sections.

This design furnishes a very compact and sturdy construction, by means of which large forces can be transmitted in a small space.

It is favourable for the assembly as well as the easy exchange of the bearing metal of the shoes if each shoe is formed by a number of lugs which are integral with the intermediate member, through which lugs passes a pin, while on said pin and between the lugs sleeve bearings with an external diameter larger than that of the lugs have been provided.

With a view to the various applications of the machine according to the invention it is advisable to create the possibility of adjusting the moment at which the raised slices of soil have to be thrown off in accordance with the place where the slice in question has to be deposited. If the slice has to be thrown off at some distance in the lateral direction, the tilting movement will be adjusted to start at a later moment than if the slice has to be deposited in the corresponding furrow. This object is attained according to the invention by members having been provided for the adjustment of the angular position of the central shaft relative to the frame and thus for the corresponding choice of the angular position of the tilting range of the blades.

The invention has further for its object to enhance the production capacity of the known machine without appreciably increasing the size of this machine or complicating the driving mechanism.

This object is attained according to the invention by the hub being composed of two or more coaxially juxtaposed units, each consisting of a number of radially arranged blades. By this measure during a single passage of the machine through the soil a wide strip of the soil is worked, while neither the length nor the height of the machine has been increased. Further the driving mechanism remains simple, since all the units revolve about the same axis.

It is observed that in order to increase the width of the strip to be worked in a single passage of the machine through the soil it has already been suggested to use a number of units, each consisting of some radially arranged blades, these units either being disposed in a staggered position relative to each other or being coaxially juxtaposed on the same shaft, this shaft being placed at an angle to the direction of movement other than 90°. This staggered or slanting position is necessary, since the units have to be arranged at some distance from each other in order that two juxtaposed units may not interfere with each other during the operation, while yet a wide strip of soil is completely worked in one passage. Both measures, to wit, the staggered position and the slant of the axis of rotation, cause an increase of the length of the machine. The former measure also complicates the driving mechanism, while the latter measure makes the machine slightly more difficult to control. It has, however, been found that by the use of tilting blades a widening of the strip of soil to be worked in one passage can be obtained without the application of one of the above-mentioned measures.

In order to obtain as uniform a loading of the machine as possible it is favourable for the units to be built in in the hub in such a relative angular position that in the interval of time between the moments at which two successive blade members of the same unit come into contact with the soil of a blade of at least one of the other units has come into contact with the soil.

This feature is also of great importance for the penetration of each blade tip into the ground surface. The reaction force of this penetrating movement is taken up by the blades which have already penetrated to a certain amount into the ground. Thus there is no tendency to raise the machine above the ground.

For the choice of the number of blades in each unit two conflicting requirements have to be taken into account. On the one hand it is favourable to make the number of blades in each unit large, in consequence of which the circumferential speed near the surface of the soil, and accordingly the influence of the centrifugal force during the operations of raising and throwing down the slice dug up, is small. However, such a large number of blades makes it necessary for the hub diameter to be large. On the other hand it is desired to keep the size of the machine as small as possible, which can only be attained by using as few blades as possible in each unit. It has been found that a favourable compromise can be reached when each unit is equipped with three blades distributed uniformly over the circumference of the hub. By this measure both the speed of the blades and the external size of each unit are kept within permissible limits.

If the machine according to the invention comprises a hub which is composed of two or more coaxially juxtaposed units, each consisting of a number of radially arranged blades, it is particularly favourable from the structural point of view if the hubs of the different units are interconnected by means of tube sections, this system being supported at the ends on the central shaft. By this measure the assembly of the machine is greatly simplified, because a tube section, a hub, etc. are pushed successively over the fixed central shaft until the desired number of units has been obtained. By means of bolt fastenings between the individual parts the whole system is combined to a rigid construction.

The invention is to be elucidated further with reference to the drawings, which illustrate an embodiment of the machine according to the invention.

FIG. 2 is a plan on an enlarged scale, partly in cross-section, of the driving mechanism and of the digging units.

FIG. 3 is a cross-section on an even more enlarged scale along the line III—III of a part of FIG. 2.

FIG. 4 is a cross-section along the line IV—IV of a part of FIG. 3.

FIG. 5 is a cross-section along the line V—V of a part of FIG. 3.

FIG. 6 is a cross-section on a smaller scale of a hub.

FIG. 7 is a longitudinal cross-section of the hub along the line VII—VII in FIG. 6.

FIGS. 8 and 9 are a side elevation and a longitudinal cross-section respectively of a tube section for connecting two juxtaposed hubs.

FIG. 10 is a development of the cam profile.

FIG. 11 is a side elevation of the adjusting mechanism of the central shaft.

FIG. 12 is a full side view of the structure shown in cross-section in FIG. 4.

Figure 1:
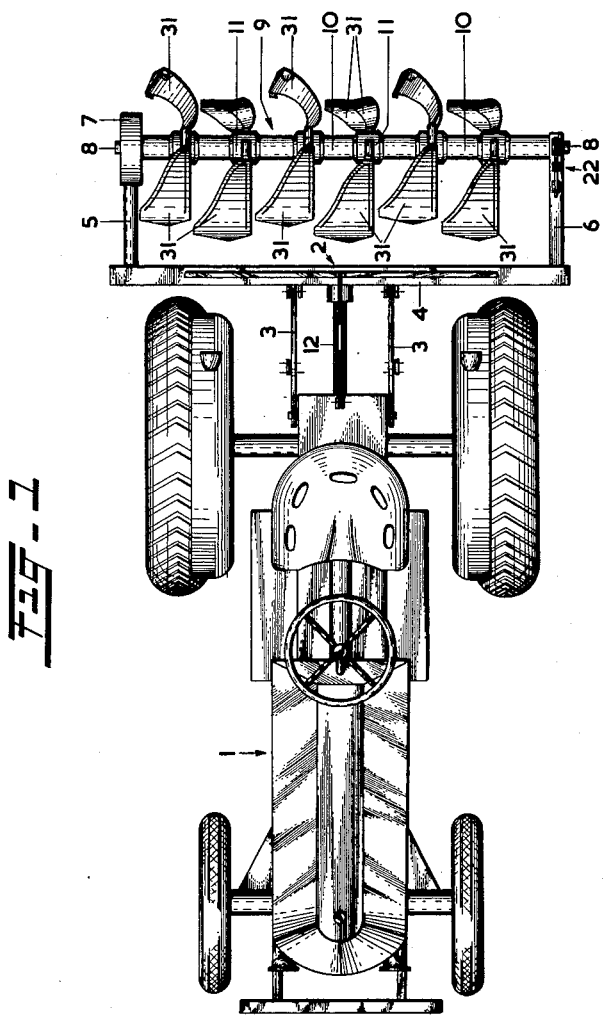
FIG. 1 is a plan of a farm tractor, provided with a machine according to the invention consisting of several units.

As may be seen in FIG. 1, at the rear of a farm tractor 1 a structural element 2 is connected via some links 3 on a liftable tool bar of the tractor. This structural element consists of a beam-shaped box 4 lying in the transverse direction, on which box is secured at either end a longitudinally extending tube 5 and 6 respectively. The tube 5 ends in a disc-shaped box 7. Extending between this box 7 and the end of the tube 6 is a shaft 8, hereinafter to be referred to as the "fixed central shaft," which shaft is locked in its longitudinal direction, but at the ends is supported in bearings fitted in the box 7 and the tube 6 respectively. Around this central shaft 8 a compound hollow shaft 9 is rotatably supported, said shaft being composed of tube sections 10 and hubs 11.

The tractor 1 is provided with a power take-off shaft 12, the end of which extends into the box 4. The rotary movement of the power take-off shaft 12 is transmitted via a chain wheel 13 and a chain 14 to a chain wheel 15, attached to the end of a shaft 16, which is rotatably supported in the tube 5. The other end of the shaft 16 is provided with a conical pinion 17 meshing with the teeth of a crown wheel 18, which in turn is attached to one end of the hollow shaft 9. This crown wheel 18 is supported on the fixed central shaft 8 by means of a roller bearing 19. This bearing serves at the same time to centre the external hollow shaft 9 relative to the shaft 8. At its other end the hollow shaft 9 is supported on the fixed shaft 8 by means of a roller bearing 20. Since the hollow shaft 9 is considerably more resistant to bending than the fixed central shaft 8, under particular circumstances another bearing may be provided between the two shafts at a point near the middle.

Secured on the end of the fixed central shaft 8 that is turned away from the crown wheel 18 is a lever arm 21 (see FIGS. 2 and 11). This lever is connected via a turnbuckle 22 of variable length with a fixed point 23 of the structural element 2. Owing to this connection the shaft 8 cannot rotate, but its angular position relative to the structural element 2 can be varied, all of which is necessary for an object to be described further below.

As may be seen in FIG. 6, each hub 11 consists of a cylindrical casing 25, which has been fitted along its circumference with a number of substantially tangentially arranged cases 26 (in the drawing, three) for the accommodation of the stub axle of a blade.

The tangentially arranged cases 26 to which the blade structures 30, 31, are fixed are also illustrated in FIG. 2.

As may be seen more clearly in FIG. 3, the stub axle 27 has the shape of a cylindrical pin with a conical end 28, on which by means of draw-bolt 29 the sleeve 30 of a blade 31 can be secured. The stub axle 27 is provided in the middle of the cylindrical part with teeth 32. The stub axle is locked in the case 26 by means of a bearing sleeve 33 resting against a shoulder 34 of the case 26 and by a gland 35, screwed in the end of the case 26 turned away from the blade 31.

On the fixed central shaft 8, inside each hub 11, a broad ring 40 has been provided and secured against rotation by a key 41. Along the circumference of this ring a cam profile 42 has been formed e.g. by milling. Inside each hub three intermediate members 43 are further slidably supported. Each intermediate member is equipped with a pin 44, on which a roller 45 is supported, said roller fitting in the cam profile 42. On its side turned away from the pin 44 each intermediate member 43 is provided with a toothed rack 46, adapted to mesh with the teeth 32 on the stub axle 27 of a blade 31. The intermediate member 43 is guided on either side through a tube section 47 provided in the hub casing 25, the axis of which tube section runs parallel to the fixed central shaft 8. On the sides facing each other the tube sections 47 have been provided over a sector of less than 180° with a longitudinally extending gap 48.

The tube sections 47 cooperate with shoes 49 provided on either side of the intermediate member 43. Each shoe is formed by four lugs 50, which are integral with the intermediate member 43. Between each pair of lugs a bushing 51 of bearing metal has been fitted by means of a pin 52 extending through both lugs. The whole system is secured by means of a spring ring 53, by which both the pin and the bushing are fixed in the longitudinal direction. The external diameter of the bushings 51 is equal to the internal diameter of the tube sections 47, so that the intermediate member is guided without play. The external diameter of the lugs 50 is slightly smaller than that of the bushings 51, so that there is no danger of contact with the tube sections 47. The portion of the intermediate member 43 leading to the lugs 50 is wedge-shaped and fits with play in the sector-shaped longitudinally extending gap 48 of the tube sections 47.

FIG. 4 shows in cross-section the structure of FIG. 3 for clarification. Since the cross-section does not give a clear view of the cam surface 42, this feature is brought out in FIG. 12 which is an illustration similar to FIG. 4, but portraying a full side view for the purpose of clearly showing the cam surface 42 into which rollers 45 engage.

As may be seen in FIGS. 6–9, in the casing 25 of each hub 11 a number of holes have been made, which are connected by pipe sections 54, whose ends have been provided with internal screw thread. Fixed on the tube sections 10 are flanges 55, also provided with holes 56. By means of fastening bolts 57 the tube sections 10 and the hubs 11 can be interconnected. The hollow shaft 9 is thus built up by successively connecting hubs 11 and coupling members or tube sections 10 with each other.

The same principle can be used for fitting the rings 40 on the fixed central shaft 8. To achieve this, the rings 40 can be fixed in the axial direction by means of tubular spacing members 58, pushed over the shaft. At the ends of the shaft 8 means are present for locking the whole system.

During the operation of the machine according to the invention the hollow shaft 9 is driven by the power take-off shaft 12 via the chain transmission 13–15, the shaft 16, the pinion 17, and the crown wheel 18. During this rotary movement of the hollow shaft 9 the rollers 45 move along the cam profile 42. This cam profile 42 has been so chosen (see FIGURE 10) that part of the circumference lies in a plane perpendicular to the fixed central shaft 8 and the remaining part bends towards the side in the axial direction. The tilting movement of each blade comprises four phases, viz.:

(a) The normal or digging position;
(b) The rotation towards the tilted position;
(c) The tilted position;
(d) The rotation backwards to the normal position.

It is observed that the duration of phase c can be reduced practically to zero. Each part of the curve ends in a flexing point (i.e. a curvature with an infinite radius), in consequence of which every beginning and every end of the lateral displacement of the roller 45 takes place altogether without shocks. During its passage through the range b–b of the revolution of the shaft 9, every roller 45 will move in the lateral direction parallel to the axis of the shaft 8, while the intermediate member 43 moves likewise and via the rack 46 imparts one limited oscillation to the stub axle 27. The cam profile 42 and the diameter of the pitch circle of the teeth 32 have been so chosen that the stub axle receives an angular displacement of more than 90° with each revolution of the hollow shaft 9. During this reciprocating movement of the intermediate member 43 the tube sections 47 and the shoes 49 provide for accurate guidance.

The angular position of the ring 40 relative to the structural element 2 is so chosen that the tilting range of each blade 31 is situated substantially in the area between the point where it has penetrated furthest into the soil and the uppermost point of its path. Dependent on the nature of the cultivating operation, the precise position of the tilting range of the blades has to be chosen. If e.g. the raised soil has to be deposited in the corresponding furrow, it is favourable to cause the tilting movement to start already near the point where the blade in question has penetrated furthest into the soil. If the raised soil has to be deposited some distance away in the lateral direction (e.g. in the case of a ditching machine), it is favourable to alter the tilting range in such a way that phase b does not begin until the blade with the soil resting on it has risen to or above the surface of the soil.

This alteration of the tilting range is obtained by the adjustment of the angular position of the fixed central shaft 8 relative to the structural element 2. This adjustment of the angular position of the shaft 8 is brought about with the aid of the lever arm 21 and the turnbuckle 22. The lengthening or shortening of the turnbuckle 22 is obtained by rotating this turnbuckle in one direction or another. In consequence the position of the lever arm 21 and of the shaft 8 with the rings 40 relative to the structural element 2 is changed. The range of the adjustment of the turnbuckle 22 is so chosen that the tilting movement of the blades can never start too soon or stop too late.

The juxtaposed units 11, 31 each include successively an angle of 40° with the next unit, so that in the interval of time between the moments at which two successive blade members of the same unit come into contact with the soil (i.e. during a rotation of the hub 11 through 120°) one blade member of the two adjacent units has come into contact with the soil. In this way a uniform force is exerted on the soil by the blades, and consequently the reaction of the soil to the machine will be uniform. In particular, the reaction of the penetrating movement of the tip of a blade into the soil will be taken up by those blades which have already penetrated over a certain depth into the earth. Thus any tendency of the blades to raise the machine above the ground is eliminated. Further the load on the driving mechanism is thus liable to few fluctuations.

During the operation of the machine the blades 31 deposit the raised slices of soil in the corresponding furrow, so that each unit is able to work a strip of soil imediately adjoining the strip worked by the adjacent units.

In the embodiment described above the units are always mounted around the shaft 8 so as to include an angle of 40° with each other. This is particularly favourable when each of the units consists of three blades. However, it is also very well possible to mount the units around the shaft 8 in such a way that they always include an angle of 60° with the adjacent units. When each unit consists of a number of blades other than three, the relative angle between the juxtaposed units should be chosen accordingly. The object is invariably to obtain a uniform loading and to avoid mutual interference of juxtaposed units during the tilting movement of the blades.

The tilting mechanism according to the invention described above, as well as the method of building it up from detachable juxtaposed sections of the hollow shaft 9 and the central shaft 8, has a number of important advantages. In the first place the assembly and the disassembly of the machine is very simple, since a number of rings 40 with a cam profile 42 and spacing members 58 are pushed over the central shaft 8, upon which the whole system is locked at the ends. The external hollow shaft 9 is built up in a similar way by successively connecting the hubs 11 and the tube sections 10 with each other.

After the intermediate members 43 and the stub axles 27 have been fitted, the angular position of each blade 31 is adjusted accurately by means of the socket joint 28, 30 and the draw-bolt 29. This has the advantage that the stub axles 27 can be secured in any desired way in the cases 26, without the position of the blade to be attached thereto having to be taken into account. The compact way in which the parts are built up inside the hub casing 25, so that they occupy little space, makes it possible to transmit large forces and to provide for efficient lubrication.

I claim:

1. A machine for cultivating the soil comprising, a supporting frame, a central shaft mounted in said frame, a hub rotatably mounted around said shaft, a plurality of stub axles rotatably mounted in said hub around the periphery thereof, each of said axles being in a plane substantially perpendicular to the axis of said central shaft, a digging tool having a substantially involute shape mounted on each of said stub axles, a cam profile surface within said hub extending around said central shaft and coaxial therewith, rollers operatively connected with said stub axles and cooperating with said cam profile surface to pivot said stub axles and the digging tools thereon, means in said supporting frame for connecting said hub to a power take-off, and an intermediate member slidably mounted in said hub to reciprocate in plane parallel to the axis of the hub and supporting one of said rollers, a toothed rack on said intermediate member, and teeth cut on at least a portion of the outer circumference of the respective stub axle and meshing with said toothed rack.

2. A machine according to claim 1 and further comprising means for guiding said reciprocating intermediate member, said guiding means comprising a tube section mounted on either side of said intermediate member within the hub, there being a longitudinally extending slot in the wall of each tube section adjacent said intermediate member and extending over a sector of less than 180°, and guide shoes extending from the sides of the intermediate member and slidably received in said tube sections to guide the reciprocating movement of said intermediate member.

3. In a machine as claimed in claim 2 wherein each of said guide shoes comprises a plurality of lugs which are integral with the respective intermediate member, a pin passing through said lugs, and sleeve bearings on said pin and between said lugs and having an external diameter greater than that of the lugs.

4. A machine as claimed in claim 1 and further comprising means for adjusting the angular position of said central shaft with respect to said supporting frame so as to determine the angular position of the tilting range of said digging blades.

References Cited in the file of this patent

UNITED STATES PATENTS

| | | |
|---|---|---|
| 757,443 | Dinwiddie | Apr. 19, 1904 |
| 1,191,430 | Johnson | July 18, 1916 |

FOREIGN PATENTS

| | | |
|---|---|---|
| 71,108 | Austria | Feb. 10, 1916 |
| 407,999 | Germany | Jan. 8, 1925 |
| 324,668 | Italy | Feb. 11, 1935 |